(12) United States Patent
Wetzig et al.

(10) Patent No.: US 9,784,639 B2
(45) Date of Patent: Oct. 10, 2017

(54) TIGHTNESS TEST DURING THE EVACUATION OF A FILM CHAMBER

(71) Applicant: Inficon GmbH, Cologne (DE)

(72) Inventors: Daniel Wetzig, Cologne (DE); Silvio Decker, Cologne (DE)

(73) Assignee: INFICON GmbH, Köln (DE)

( * ) Notice: Subject to any disclaimer, the term of this patent is extended or adjusted under 35 U.S.C. 154(b) by 47 days.

(21) Appl. No.: 14/914,692

(22) PCT Filed: Aug. 18, 2014

(86) PCT No.: PCT/EP2014/067591
§ 371 (c)(1),
(2) Date: Feb. 26, 2016

(87) PCT Pub. No.: WO2015/028338
PCT Pub. Date: Mar. 5, 2015

(65) Prior Publication Data
US 2016/0209294 A1 Jul. 21, 2016

(30) Foreign Application Priority Data
Aug. 29, 2013 (DE) .................. 10 2013 217 288

(51) Int. Cl.
*G01M 3/00* (2006.01)
*G01M 3/26* (2006.01)
*G01M 3/32* (2006.01)

(52) U.S. Cl.
CPC ........ *G01M 3/3218* (2013.01); *G01M 3/3281* (2013.01)

(58) Field of Classification Search
CPC ............ G01M 3/00; G01M 3/02; G01M 3/10; G01M 3/26; G01M 3/32; G01M 3/3218; G01M 3/3281
See application file for complete search history.

(56) References Cited

U.S. PATENT DOCUMENTS

| 3,813,923 A | 6/1974 | Pendleton |
| 3,818,752 A | 6/1974 | Lindeberg |
| 5,513,516 A * | 5/1996 | Stauffer ................ G01M 3/329 73/49.2 |
| 5,520,003 A * | 5/1996 | Cornfield .............. G01M 3/228 150/154 |
| 7,000,456 B2 * | 2/2006 | Lehmann ............ G01M 3/3281 73/40 |
| 2001/0003917 A1 | 6/2001 | Sagi et al. |
| 2008/0127716 A1* | 6/2008 | Eliasson ............... G01M 3/363 73/45.4 |
| 2010/0313634 A1* | 12/2010 | Wetzig .................. G01M 3/226 73/40.7 |

(Continued)

FOREIGN PATENT DOCUMENTS

| DE | 1246278 | 2/1968 |
| NL | EP 0741288 A1 * | 11/1996 .......... G01M 3/3218 |

*Primary Examiner* — Nguyen Ha
(74) *Attorney, Agent, or Firm* — The Webb Law Firm

(57) ABSTRACT

A method for testing the sealing tightness of a specimen, containing a gas, in a film chamber made from flexible material. The film chamber is evacuated by a vacuum pump and the gas flow flowing out of the film chamber and generated by the vacuum pump is measured during the evacuation and is examined with respect to a possible leak of the specimen.

12 Claims, 1 Drawing Sheet

(56) References Cited

U.S. PATENT DOCUMENTS

| | | | | |
|---|---|---|---|---|
| 2011/0011164 A1* | 1/2011 | Terentiev | ............... | G01M 3/229 |
| | | | | 73/40.7 |
| 2014/0311222 A1* | 10/2014 | Decker | ............... | G01M 3/3218 |
| | | | | 73/40 |
| 2014/0326051 A1* | 11/2014 | Wetzig | ................ | G01M 3/3281 |
| | | | | 73/40 |
| 2015/0241298 A1* | 8/2015 | Decker | ............... | G01M 3/3218 |
| | | | | 73/40 |

* cited by examiner

TIGHTNESS TEST DURING THE EVACUATION OF A FILM CHAMBER

CROSS-REFERENCE TO RELATED APPLICATIONS

This application is the United States national phase of International Application No. PCT/EP2014/067591 filed Aug. 18, 2014, and claims priority to German Patent Application No. 10 2013 217 288.5 filed Aug. 29, 2013, the disclosures of which are hereby incorporated in their entirety by reference.

BACKGROUND OF THE INVENTION

Field of the Invention

The invention relates to a method for testing the tightness of a gas-containing specimen in a film chamber of a flexible material.

Description of Related Art

Film chambers are test chambers testing the tightness of specimens such as food packages or other flexible packages. Here, a film chamber is made at least in part of a soft flexible material which clings to the specimen in the film chamber when the film chamber is evacuated. A vacuum is generated inside the film chamber in the external environment of the specimen. This vacuum expels a filling gas contained in the specimen through possible leaks into the external environment of the specimen inside the film chamber. The atmospheric pressure outside the film chamber prevents the internal pressure of the specimen from causing the specimen to burst in the vacuum.

Conventionally, two alternative methods are known for testing the tightness of a specimen in a film chamber. In one method, a test gas is added to the filling gas in the specimen and the test gas partial pressure is measured in the gas flow of the vacuum system of the film chamber. Here, the test gas partial pressure serves as the measure for the leakage rate.

The other test method is independent of filling gas. In a first step the film chamber is evacuated and then a valve to the vacuum pump system is closed. Thereafter, in a second step, the pressure increase over time is measured inside the film chamber and outside the specimen. This pressure increase serves as a measure for the leakage rate of the specimen. Due to the two steps "evacuation" and "pressure measurement" that have to be performed one after the other, this method is disadvantageous for industrial tightness tests, since these require short cycle rates in tightness testing. It is another disadvantage that in case of a large leakage of the specimen the filling gas will be pumped out from the specimen already during the evacuation phase. Thus, after evacuation, the specimen is also evacuated and will erroneously be considered tight during the pressure measurement phase.

It is an object of the invention to provide an improved method for testing the tightness of a specimen in a film chamber.

SUMMARY OF THE INVENTION

In the test method of the present invention, the gas flow from the film chamber, generated by the vacuum pump, is measured already during evacuation and is checked for a possible leak in the specimen already during evacuation. Here, it is possible to omit the measurement of the pressure conventionally performed after evacuation during the accumulation of the gas flowing from a possible leak in the specimen. Preferably, the gas flow measured during evacuation is compared with the course of the gas flow in the case of a tight specimen. The gas flow in the case of the tight specimen serves as a reference gas flow. This reference gas flow may be measured and stored prior to the actual pressure measurement. The leakage rate of the specimen may then be determined by subtracting the reference gas flow from the measured gas flow.

The measurement may be performed using a flow sensor in the exhaust gas flow of the vacuum pump or, as an alternative, using a differential pressure sensor at a throttle point, which sensor is arranged in the pipe system that connects the film chamber and the vacuum chamber, so as to evacuate the film chamber by means of the vacuum pump.

Prior to measurement, a ratio of the gas quantity in the film chamber outside the specimen and the gas quantity inside the specimen should be reduced, for example by adapting the volume of the film chamber to the volume of the specimen.

BRIEF DESCRIPTION OF THE DRAWINGS

The following is a detailed explanation of embodiments of the invention with reference to the drawings. In the Figures.

DESCRIPTION OF THE INVENTION

Figure 1:
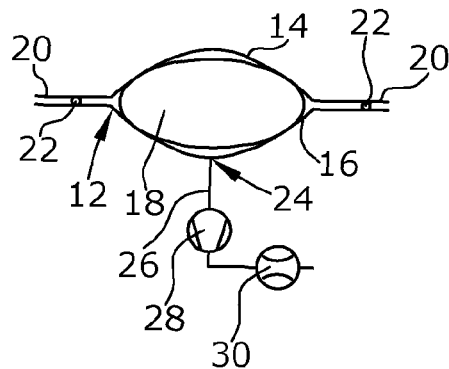
FIG. 1 shows a first embodiment of the present invention.

In all embodiments, the film chamber 12 is formed by two flexible films 14, 16 that enclose the specimen 18 and are provided with an O-ring seal 22 in the region of their edge 20 surrounding the specimen 18. The O-ring seal 22 is positioned between both films 14, 16 in a manner abutting the same and prevents gas from flowing into the film chamber 12 via the edge portion 20 of the two films 14, 16. The lower film 16 has a connector 24 for a gas-carrying pipe line 26 that is connected with a vacuum pump 28 in order to evacuate the film chamber 12.

The specimen 18 typically is a flexible food package illustrated in an oval shape in the Figures for reasons of simplicity. The specimen 18 is filled with a filling gas and the volume of the film chamber 12 is adapted to the volume of the specimen 18. That means that the volume remaining in the film chamber 12 outside the specimen 18 is small.

Figure 2:
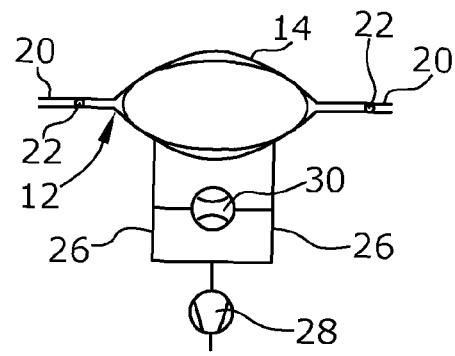
FIG. 2 shows a second embodiment of the present invention.
Figure 3:
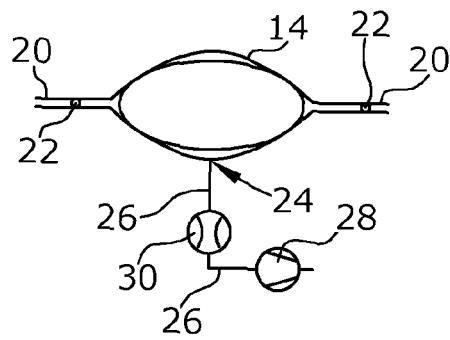
FIG. 3 shows a third embodiment of the present invention.
Figure 4:
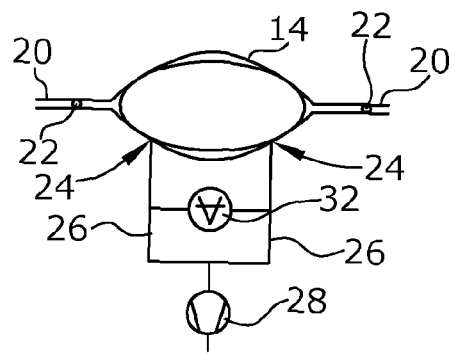
FIG. 4 shows a fourth embodiment of the present invention.

In FIG. 1, a flow sensor 30 is arranged downstream of the vacuum pump 28 in order to measure the gas flow in the exhaust gas flow of the vacuum pump 28. In FIG. 2, the flow sensor 30 in the pipe system 26 connecting the film chamber 12 and the vacuum pump 28 is arranged in parallel with the vacuum pump 28. In FIG. 3, the flow sensor 30 in the pipe system 26 connecting the film chamber 12 and the vacuum pump 28 is arranged in series with the vacuum pump 28. In this case, the flow sensor 30 is situated exactly between the film chamber 12 and the vacuum pump 28. In FIG. 4, a pressure sensor 32 in the pipe system 26 connecting the film chamber 12 and the vacuum pump 28 is arranged in parallel with the vacuum pump 28. The embodiment of FIG. 4 corresponds to the embodiment of FIG. 2 except for the flow sensor 30.

Figure 5:
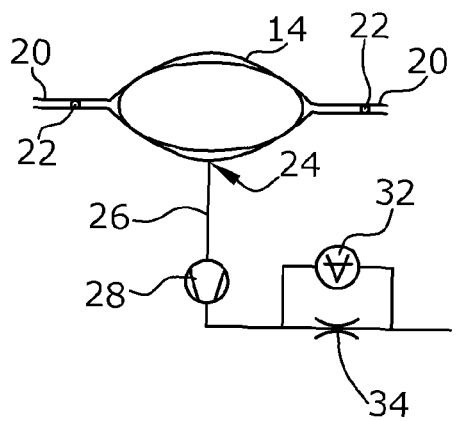
FIG. 5 shows a fifth embodiment of the present invention.
Figure 6:
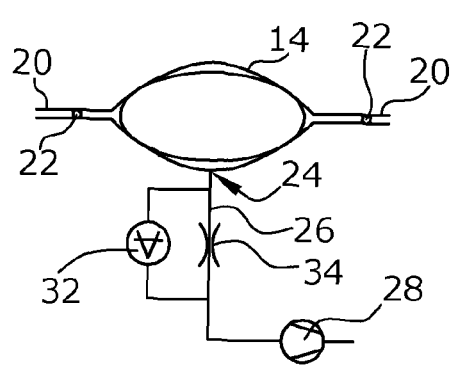
FIG. 6 shows a sixth embodiment of the present invention.

In the embodiment of FIG. 5, the pressure sensor is arranged downstream of the vacuum pump 28, and in the embodiment of FIG. 6 it is included in the pipe system that connects the film chamber 12 and the vacuum pump 28. In the embodiments of FIGS. 5 and 6, the pressure sensor 30 is respectively arranged in parallel with a throttle point 34 in order to measure the pressure drop over the throttle point 34.

It is common to all embodiments that the measurement of the gas flow, i.e. either by means of the flow sensor 30 or the pressure sensor 32, is performed already during the evacuation of the film chamber 12 by means of the vacuum pump 28. Thus, the difference to the conventional test method according to the pressure increase method is that the measurement is not performed in a separate step after evacuation. The expenditure of time for testing the tightness of the specimen 18 is thereby reduced significantly. In all embodiments, the total gas flow $Q_{total}$ pumped out of the film chamber 12 during the testing process is composed of the gas quantity $Q_{chamber}$ from the film chamber 12 outside the specimen 18 and the gas quantity $Q_{leak}$ from the specimen 18:

$$Q_{total} = Q_{chamber}(t) + Q_{leak}(p,t) \quad (1)$$

The course over time of these two partial flows is a function of the pressure inside the film chamber 12. At the beginning of the pumping by means of the vacuum pump 28, first only the gas from the film chamber 12 outside the specimen 18 will flow to the vacuum pump 28:

$$Q_{chamber} = S \times \Delta p_{chamber} \quad (2)$$

S: suction capacity at the film chamber

At this time, i.e. at the beginning of the pumping, no gas flows from the specimen 18 yet, since no sufficient driving force exists in the form of a differential pressure $\Delta p_{specimen}$ between the pressure inside the specimen 18 and the pressure in the environment of the specimen 18 inside the film chamber 12:

$$\Delta p_{specimen} = 0,$$

where $$Q_{leak} = L \times \Delta p_{specimen} \quad (3)$$

L: conductance of the leak channel at the specimen

As the pressure $p_1$ inside the film chamber 12 outside the specimen 18, the driving force acting on the leak in the specimen 18 increases so that also the leakage rate increases. With large leaks in the specimen 18 and a small gas quantity inside the specimen 18, the pressure $p_2$ decreases inside the specimen as well, since the gas from the specimen is also pumped off by the vacuum pump 28. The specimen is pumped empty and the leakage gas flow ends. In this state, according to the conventional method for pressure increase measurement, a specimen was erroneously determined as being tight.

The following generally applies:

$$\Delta p_{chamber} = p_1 - p_0,$$

$$\Delta p_{specimen} = p_2 - p_1,$$

$p_0$=pressure at the chamber connection flange (pump nozzle), $p_1$=pressure in the film chamber 12 outside the specimen 18 and $p_2$=pressure inside the specimen 18.

In order that the flow signal of the leakage rate becomes large compared to the flow from the film chamber 12, the ratio of the gas quantity in the test chamber 12 outside the specimen 18 and the gas quantity inside the specimen 18 must be as low as possible at the start of the process. This may be achieved by adapting the test volume of the film chamber 12 to the specimen 18. In this regard, the volume of the film chamber 12 is maintained as small as possible. The size of the specimen 18 defines the necessary diameter of the film chamber. The pressure in the film chamber 12 outside the specimen 18 will then drop rather quickly and the flow from the specimen 18 can be measured early on.

Whereas in the leakage measurement according to the pressure increase method, in which the pressure increase is measured in the film chamber 12 outside the specimen 18 (1. phase: evacuate, 2. phase: accumulation and pressure measurement), the leakage measurement according to the method of the invention is performed directly in the first and only phase (evacuation). The time per test cycle is reduced thereby.

The invention claimed is:

1. A method for testing sealing tightness of a specimen, containing a gas, in a film chamber made from flexible material, the film chamber being evacuated by a vacuum pump, wherein a gas flow flowing out of the film chamber and generated by the vacuum pump is measured during the evacuation and is examined with respect to a possible leak of the specimen.

2. The method of claim 1, wherein prior to measurement, a ratio of the gas quantity in the film chamber outside the specimen and the gas quantity inside the specimen is reduced.

3. The method of claim 1, wherein the gas flow measured is compared with a course of a reference gas flow.

4. The method of claim 3, wherein the reference gas flow is a gas flow for a tight specimen.

5. The method of claim 3, wherein the course of the reference gas flow is measured and stored in advance.

6. The method of claim 3, wherein a leakage rate is determined by subtracting the reference gas flow from the measured gas flow.

7. The method of claim 1, wherein the measurement is made using a flow sensor.

8. The method of claim 7, wherein the flow sensor is situated in an exhaust gas flow of the vacuum pump.

9. The method of claim 1, wherein the measurement is performed at a throttle point of a gas-carrying system.

10. The method of claim 9, wherein the gas-carrying system is a pipe system connecting the film chamber and the vacuum pump.

11. The method of claim 1, wherein the gas flow from one pump-off line to another is measured during the evacuation phase and is used to determine a leakage rate from the specimen.

12. The method of claim 1, wherein a pressure difference between two pump-off lines during the evacuation phase is used to determine a leakage rate from the specimen.

* * * * *